United States Patent [19]
Hertrich

[11] Patent Number: 5,857,634
[45] Date of Patent: Jan. 12, 1999

[54] TAKE-UP REEL LOCK

[75] Inventor: Greg Hertrich, Longmont, Colo.

[73] Assignee: Quantum Corporation, Milpitas, Calif.

[21] Appl. No.: 892,500

[22] Filed: Jul. 14, 1997

[51] Int. Cl.$^6$ .............................. G03B 1/58; G11B 15/66
[52] U.S. Cl. ................................ 242/338.1; 242/332.4; 242/332.7
[58] Field of Search .................. 242/332, 332.1, 242/332.4, 332.7, 338.1; 360/96.5

[56] References Cited

U.S. PATENT DOCUMENTS

| | | | |
|---|---|---|---|
| 3,706,423 | 12/1972 | Neff . | |
| 3,813,056 | 5/1974 | Hagen et al. | 242/332.4 |
| 3,934,840 | 1/1976 | Inaga | 242/332.4 |
| 4,477,851 | 10/1984 | Dalziel et al. | 242/332.4 |
| 4,520,970 | 6/1985 | Rasmussen | 242/332.7 |
| 4,646,177 | 2/1987 | Sanford et al. | 242/332.4 |
| 4,662,049 | 5/1987 | Hertrich . | |
| 4,679,747 | 7/1987 | Smith . | |
| 4,720,913 | 1/1988 | Hertrich . | |
| 5,046,168 | 9/1991 | Ohsaki | 242/332.4 |
| 5,219,129 | 6/1993 | Spicer et al. | 242/332.1 |
| 5,333,810 | 8/1994 | Hoge et al. | 242/332.4 |
| 5,374,003 | 12/1994 | Hoge et al. | 242/332.7 |
| 5,492,284 | 2/1996 | Sorensen | 242/338.1 |
| 5,769,346 | 6/1998 | Daly | 242/332.4 |

Primary Examiner—John P. Darling
Attorney, Agent, or Firm—John C. Chen

[57] ABSTRACT

A locking system for preventing a take-up reel of a tape drive from rotating when a tape cartridge is not inserted to the drive. Locking elements are defined about the take-up reel, a buckling mechanism, and a load ring to interact and provide locking engagement to prevent take-up reel rotation. The take-up reel, buckling mechanism and load ring rotate in concert during insertion and removal of the cartridge and are positioned relative to each other such that as the tape cartridge is inserted to the tape drive, locking elements disengage to enable rotation of the take-up reel. As the cartridge is inserted into the drive, locking elements return to locking engagement.

17 Claims, 11 Drawing Sheets

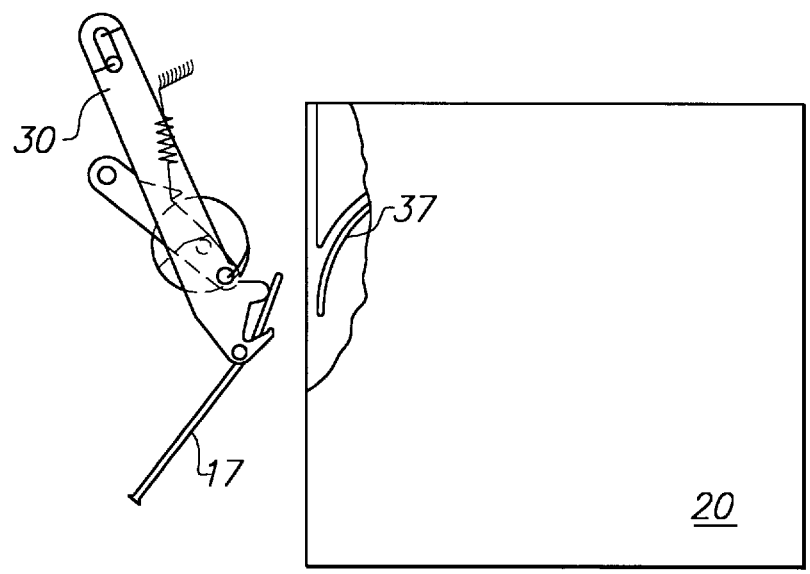
FIG. 2 (Prior art.)
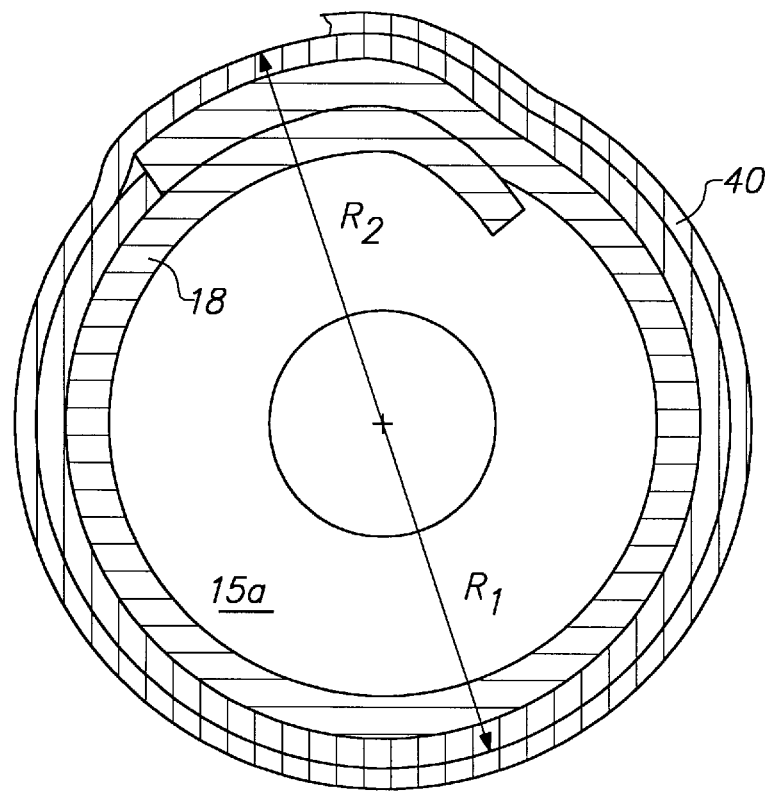
FIG. 3

TAKE-UP REEL LOCK

FIELD OF THE INVENTION

The present invention relates to tape recording. More particularly, the present invention relates to a locking mechanism for preventing rotation of a take-up reel in a single reel cartridge tape drive.

BACKGROUND OF THE INVENTION

By way of example, and shown in FIG. 1, a conventional magnetic tape drive 5, comprises a rectangular shaped housing 11, an opening 14 defined therein for accepting a removable tape cartridge 20, a pair of spindle motors 10a and 10b, mounted therein, and a permanently mounted rotatable take-up reel 15. First spindle motor 10a is adapted for accepting the take-up reel while the second motor 10b is adapted for accepting the removable tape cartridge 20. Generally, the tape drive 5 further includes a head assembly 25 positioned intermediate the take-up reel 15 and the tape cartridge 20. The head assembly 25 is further positioned along a tape path 30, defined by a plurality of tape guide rollers 35. In the tape drive shown in FIG. 1, the tape path is defined by six rollers 35.

Although not shown in FIG. 1, tape drive 5 also includes a buckling mechanism 36, shown in FIG. 2, for "buckling", or attaching a take-up leader 17 with a cartridge leader 37. Typically, the buckling mechanism 36 is mounted to the drive 5 at a position intermediate the take-up reel 15 and the cartridge 20. When the tape cartridge 20 is not inserted into the drive 5, the buckling mechanism engages the take-up leader 17. The take-up leader 17 is a thin strip of polyester film e.g. Mylar, attached to the take-up reel 15. The cartridge leader is defined at the end of the data storage tape wound within the cartridge 20. As the cartridge 20 is inserted into tape drive 5, the buckling mechanism 36 releases take-up leader 17 and urges the take-up leader 17 to buckle with the cartridge leader 37.

The process of buckling tape leaders is known. For example, commonly assigned U.S. patent application Ser. No. 08/666,854, now U.S. Pat. No. 5,769,346, entitled "TAPE BUCKLING MECHANISM FOR SINGLE REEL CARTRIDGE TAPE RECORDING" describes tape leader buckling process and is therefore incorporated herein by reference.

Typically, the thickness of the leaders and the thickness of the magnetic data storage tape are not the same, i.e. the leader is thicker than data storage tape. Thus, as the leaders and tape are spooled onto a take-up reel, the take-up leader 17 length and the cartridge leader 37 length must add up to a specific length so as to minimize a condition known as "radial runout" at the take-up reel. Radial runout occurs when the cumulative length of the take-up leader and the cartridge leader, when buckled, is not equivalent to the circumference of the take-up reel hub or a multiple thereof. This condition is best illustrated in FIG. 3, which provides a magnified view of the buckled leaders 18 and tape 40 wound around the take upon reel hub 15a. As shown, the cumulative length of the buckled leaders 18, is greater than the circumference of the take-up reel hub 15a. The net effect of radial runout is that the stack of wound tape 40 becomes asymmetrical. As shown in FIG. 3, the radius on one half of the tape stack, represented by R1, is less that the radius on the other half, represented by R2. Radial runout leads to non-constant tape speed. Consequently, servo control and overall drive performance may be degraded.

Unfortunately, a consequence of fixing the cumulative length of the take-up leader and the cartridge leader to avoid radial runout, is that the take-up leader 17 may have a length which is excessively longer than the tape path, as shown in FIG. 4. This creates the possibility of the take-up leader becoming disengaged from the buckling mechanism during shipment or anytime the tape cartridge is not inserted. For example, a counter clockwise rotation, represented by the arrow D1, of take-up reel 15 would create slack in the take-up leader 17, which may cause the take-up leader to disengage from the buckling mechanism 97.

Thus, there remains an unsolved need for a take-up reel locking mechanism for preventing the take-up reel from rotating when a tape cartridge is not inserted into the tape drive.

SUMMARY OF THE INVENTION

The present invention provides a locking system disposed within a tape drive which prevents a take-up reel from rotating when a tape cartridge is not inserted into the tape drive.

In accordance with principles of the present invention, a take-up reel locking system comprises locking features defined on a buckling mechanism, the take-up reel and a load ring. The rotatable buckling mechanism is positioned in proximity to the take-up reel such that a locking dimple defined on a rotatable buckling cam is able to engage with a locking dimple defined along an outer periphery of the take-up reel flange. Similarly, the load ring is positioned relative the buckling cam such that a contact area defined on the buckling cam is able to engage with a locking area defined on a tape drive load ring. When the tape cartridge is not inserted into the tape drive, the aforementioned locking features engage in locking manner to prevent the take-up reel from rotating. Specifically, engagement between the locking areas of the load ring and the buckling cam prevent the buckling cam to rotate in the clockwise direction. As a result, the locking engagement between the dimples on the buckling cam and the take-up reel prevent counterclockwise rotation of the take-up reel. In addition, a take-up leader having the same length as the tape path and being attached at one end to the take-up reel and secured at the other end by the buckling cam, prevents the take-up reel from rotating in the clockwise direction.

As the tape cartridge is inserted, the load ring releases locking engagement with buckling cam, thereby enabling buckling cam to release engagement with take-up reel and enabling take-up reel to freely rotate.

These and other advantages, aspects and features of the present invention will be more fully understood and appreciated upon consideration of the following detailed description of a preferred embodiment, presented in conjunction with the accompanying drawings.

BRIEF DESCRIPTION OF THE DRAWINGS

In the Drawings:

FIG. 2 is a plan view of a prior art buckling mechanism, shown in position to buckle a take-up leader with a cartridge leader as the cartridge is inserted.

FIG. 3 is a magnified cross sectional view of a hub section of a take-up reel illustrating radial runout.

DETAILED DESCRIPTION OF A PREFERRED EMBODIMENT

In the following description, numerous specific details are set forth in order to provide a thorough understanding of the present invention. It will be apparent, however, to one skilled in the art, that the present invention may be practiced without some or all of these specific details. In other instances, details of well known structures and/or process steps will not be described in detail in order not to unnecessarily obscure the present invention.

Figure 1:
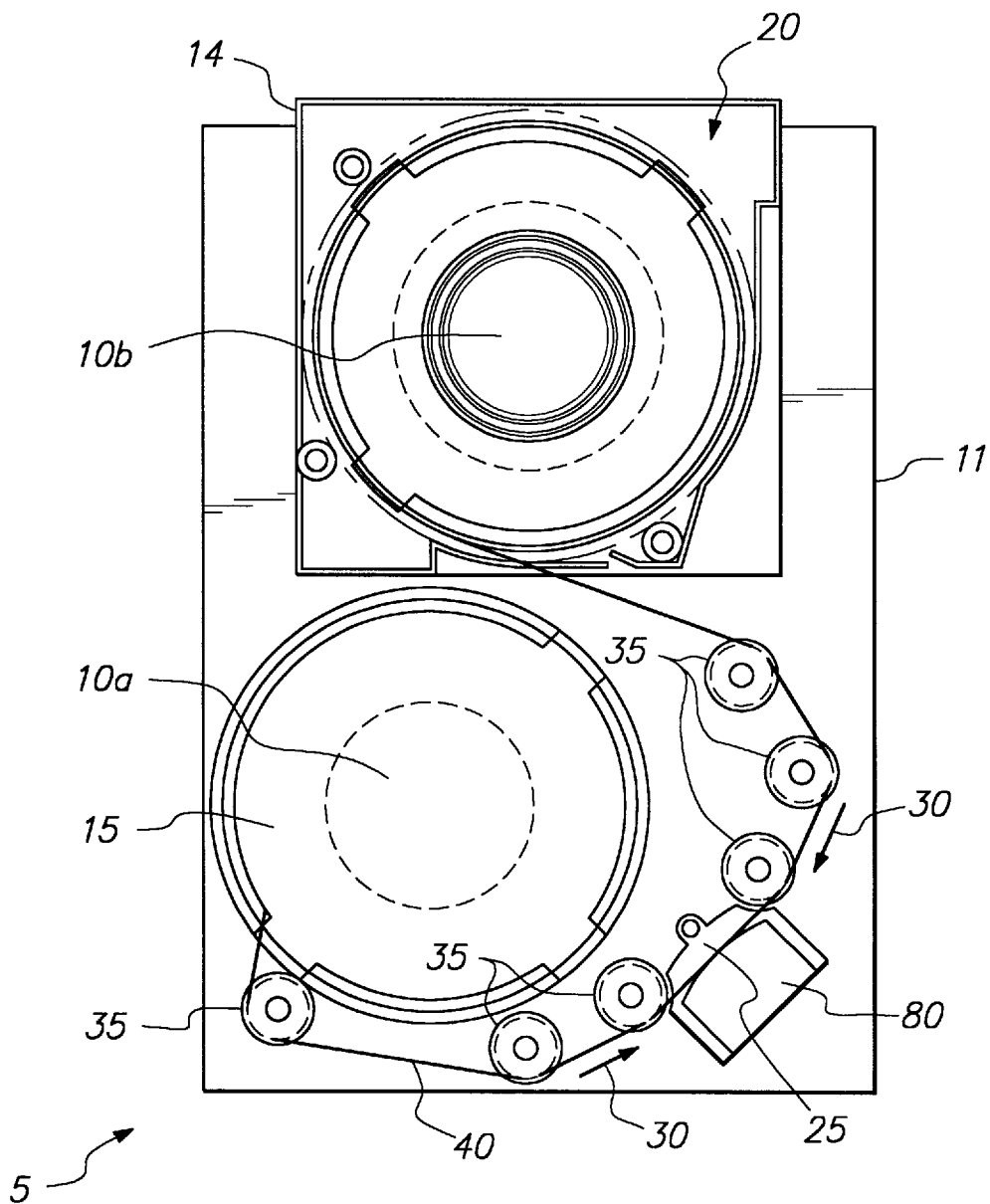
FIG. 1 is a plan view of a prior art single-reel tape drive, shown without a tape cartridge.
Figure 4:
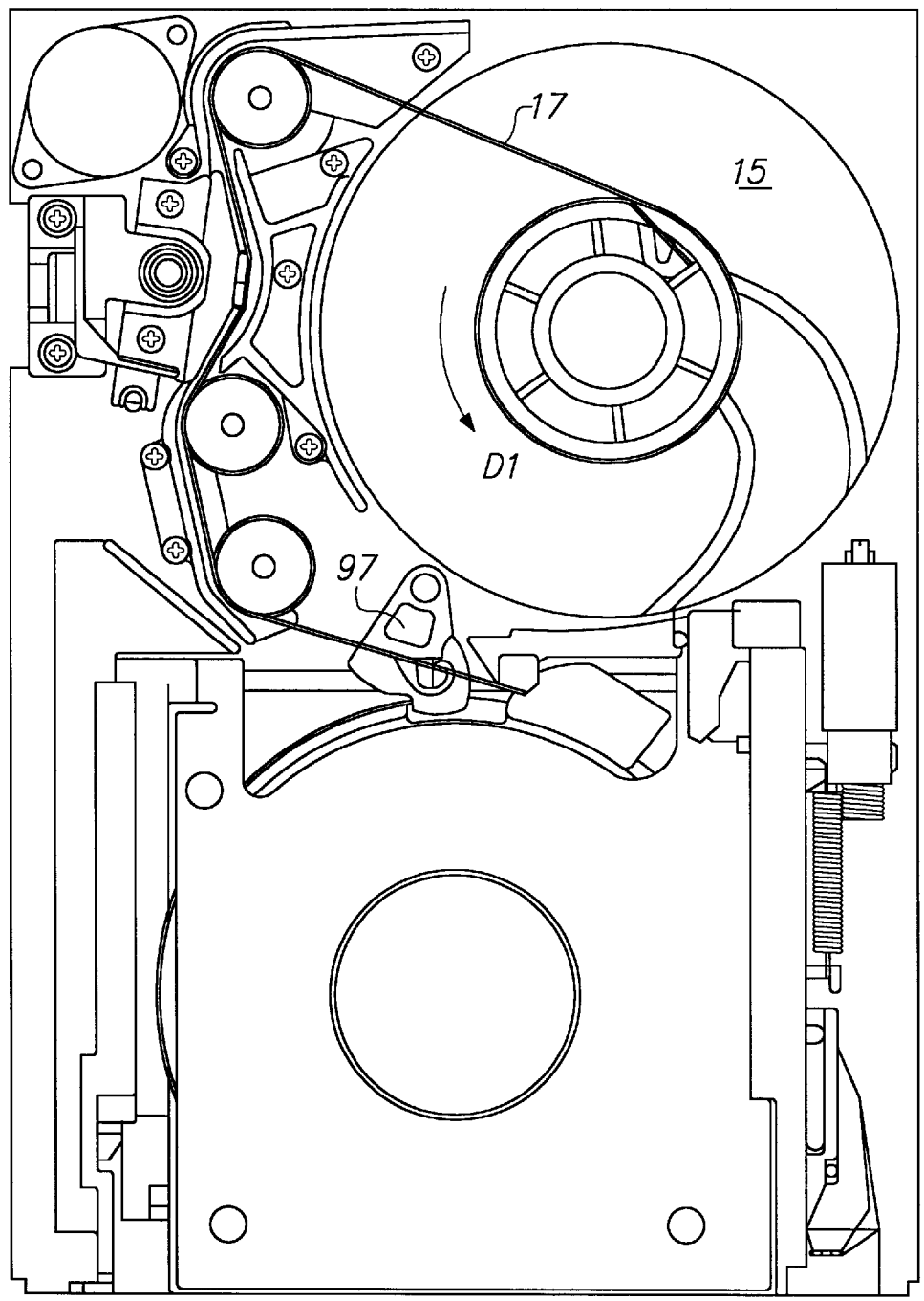
FIG. 4 is a plan view of a tape drive illustrating a take-up leader length which is excessively longer than the tape path.
Figure 5A:
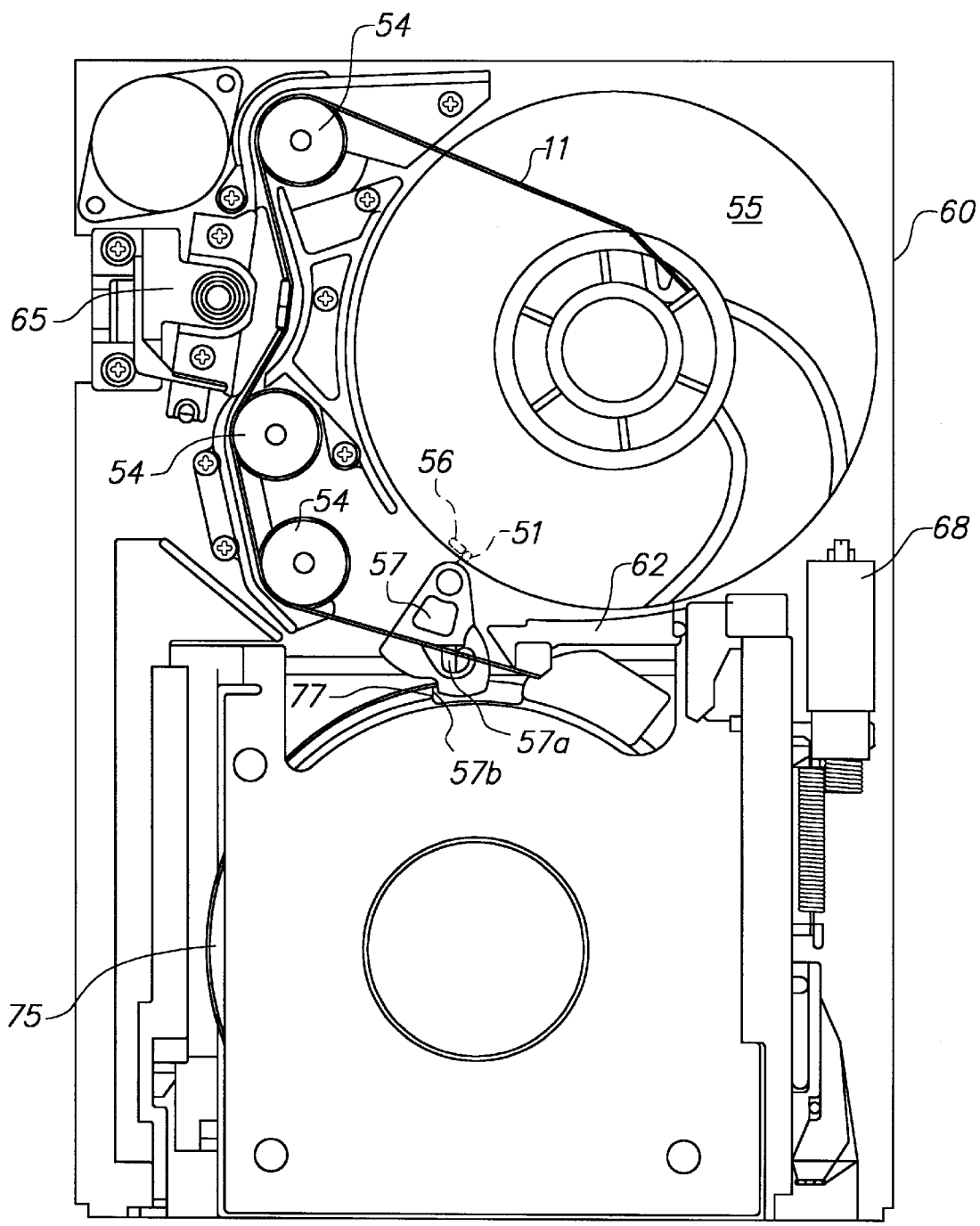
FIG. 5a is a plan view of a tape drive having the take-up reel locking system in accordance with principles of the present invention.

The present invention is disposed within a tape drive 60 of FIG. 5a. As shown, tape drive 60 includes a rotatable take-up reel 55, a take-up leader 11, a tape path defined by three tape guides 54, a head assembly 65, a buckling mechanism comprising a rotatable buckling cam 57 and a pivotable buckling arm 62, a rotatable load ring 75 (shown in partial view), and a DC motor 68. As with tape drives of the prior art, such as FIG. 1, take-up leader 11 is attached at one end to the take-up reel 55 and secured by a hook member 57a, about the other end, when a tape cartridge is not inserted. Buckling cam 57 and buckling arm 62 perform the same basic function as the buckling mechanism shown in FIG. 2. That is, buckling cam 57 includes the integrated hook member 57a for engaging the take-up leader 11 when a tape cartridge is not inserted into the tape drive, and releasing the take-up leader 11 after the cartridge is inserted. Buckling arm 62 urges the tip of take-up leader 11, commonly known as a "mushroom", into a buckling relationship with the cartridge leader (not shown), provided by the cartridge. However, the present buckling mechanism is an improvement over the prior art because the present two member buckling mechanism enables buckling arm 62 to keep take-up leader 11 in a buckling relationship with the cartridge leader after hook member 57a releases engagement with the take-up leader 11. Thus, the possibility of the leaders disengaging before buckling is completed is minimized.

Figure 5B:
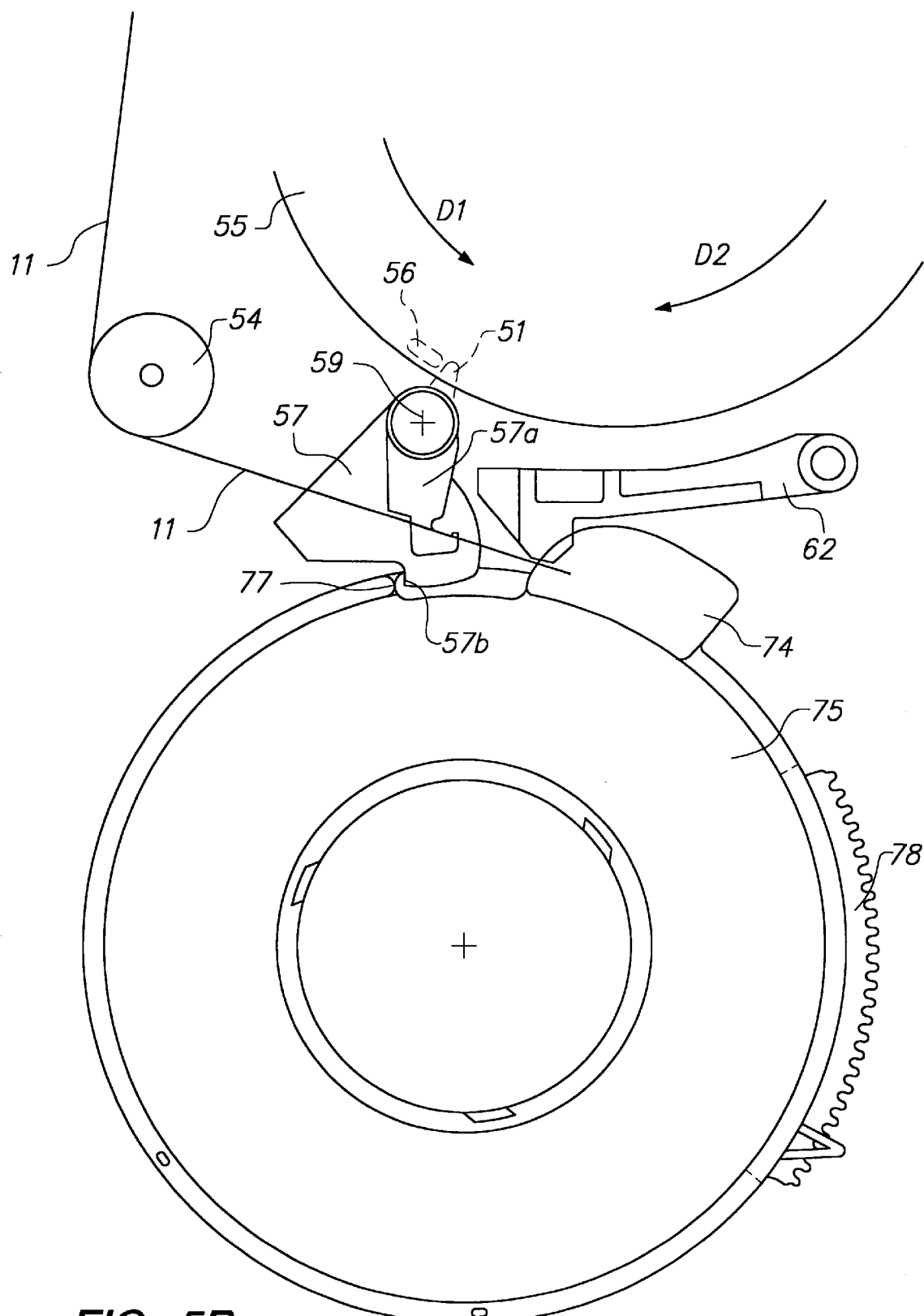
FIG. 5b is a magnified view of the locking mechanism of FIG. 5a, shown with the load ring and take-up reel.

As shown in FIG. 5b, load ring 75 is a circular disk-like member rotatably mounted adjacent the buckling cam 57 and buckling arm 62. Load ring 75 includes a camming surface 74, arcuate teeth member 78 and the locking area 77. As will be explained hereinbelow, locking area 77 provides an engaging surface which contact area57b abuts against. It is the engagement between these locking features, 77 and 57b, which prevents buckling cam 57 from rotating, which in turn prevents take-up reel 55 from rotating. Arcuate teeth member 78 meshes with a gear train (not shown) extending from the DC motor 68 to transfer limited rotation to load ring 75. As will be explained hereinbelow, load ring 75 enables camming surface to release hook member 57a from the take-up leader 11. In addition, load ring 75 also functions to enable a reel driver (not shown), mounted to a cartridge reel spindle motor, to engage the cartridge reel. Load ring 75 also includes a through hole defined about its center to enable the reel driver to access the cartridge reel.

The present invention is shown, in magnified view, in FIG. 5b, along with the load ring 75 and take-up reel 55. As presented, the locking system preferably includes a locking dimple 56 defined along the outer periphery of a flange of take-up reel 55, a locking element 51 defined on buckling cam 57, a contact area57b defined on the buckling cam 57 and a locking area 77 defined along the periphery of load ring 75. It is also preferable to define the locking dimple 56 on the bottom flange of take-up reel 55.

Buckling cam 57 is rotatably mounted about its rotational center 59 to the tape drive. A biasing mechanism (e.g. a coil spring) urges the buckling cam 57 into the "unload" position shown in FIG. 5b. Buckling cam 57 includes a contact area 57b which is engageable with locking area 77 and also includes an integrated hook member 57a. As shown in FIG. 5b, while the tape cartridge is not inserted into the tape drive, hook member 57a engages take-up leader 11, keeping the take-up leader 11 in position to buckle the cartridge leader, and releases take-up leader 11 after the cartridge is inserted. As will be explained herein below, the buckling cam 57 is mounted at a position relative to take-up reel 55 such that locking element 51 and locking dimple 56 may rotate into locking engagement during cartridge removal. When engaged, take-up reel 55 is prevented from rotating in the counter clockwise direction, represented by the arrow D1. In this position, take-up reel 55 is also prevented from rotating in the clockwise direction, represented by arrow D2, by the take-up leader 11, which preferably has the same length as the tape path. If the take-up leader 11 has a length greater than the tape path, engaging contact between locking area 77 and locking fact 57b prevent any possible clockwise rotation of the take-up reel 11.

Figure 5C:
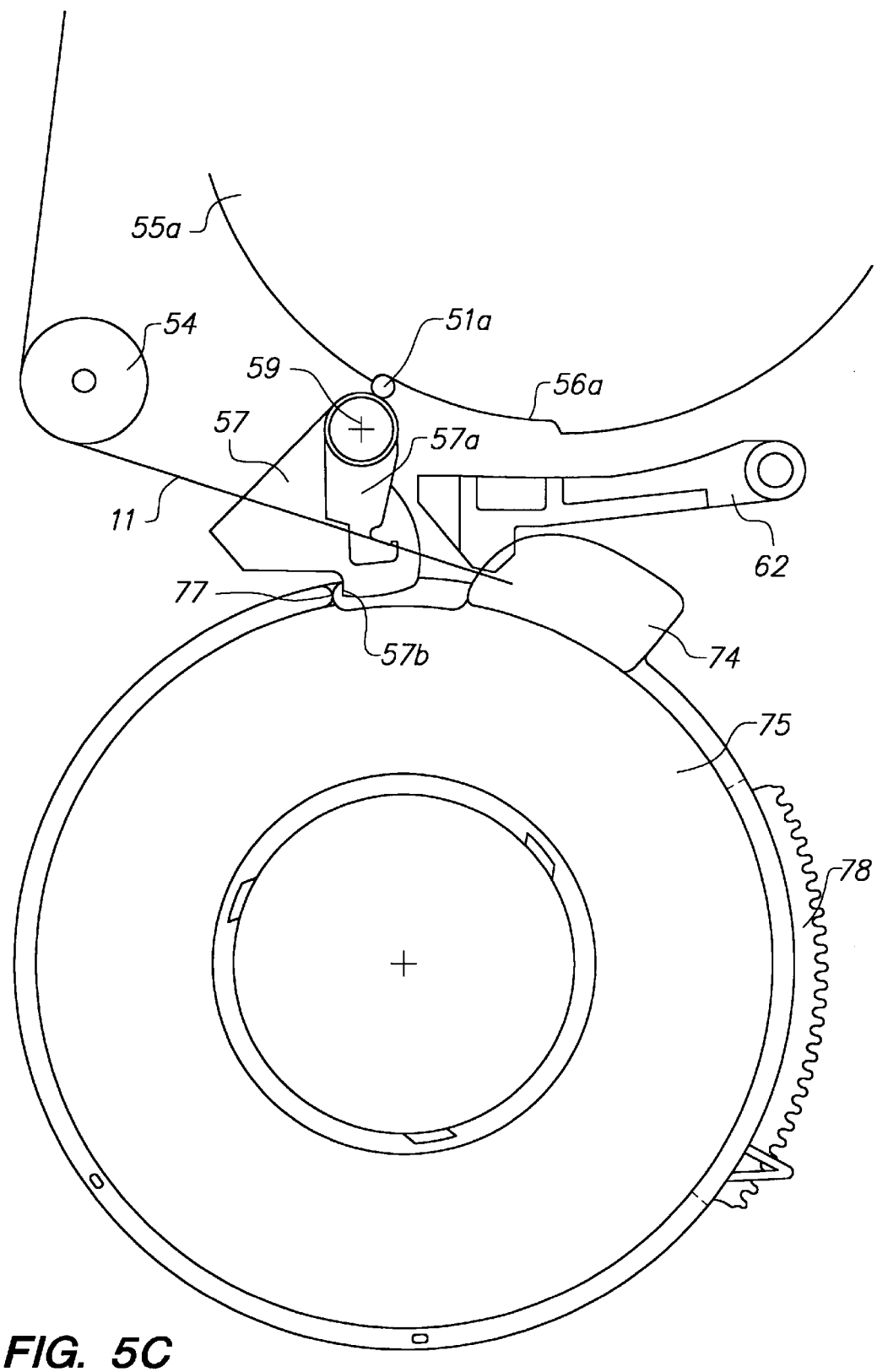
Fig. 5c is a magnified view of an alternative locking mechanism, shown with the load ring and take-up reel.

Alternatively, as illustrated in FIG. 5c, locking dimple 56 may be replaced by an arcuate shaped cutout 56a formed along the outer periphery of bottom flange 55a of take-up reel 55. The cutout 56a may be located in approximately the same location as the dimple 56, so as to similarly enable locking element 51a to engage the cutout 56a. The engagement thereby similarly prevents counterclockwise rotation of take-up reel 55, when the cartridge is not inserted.

Figure 6:
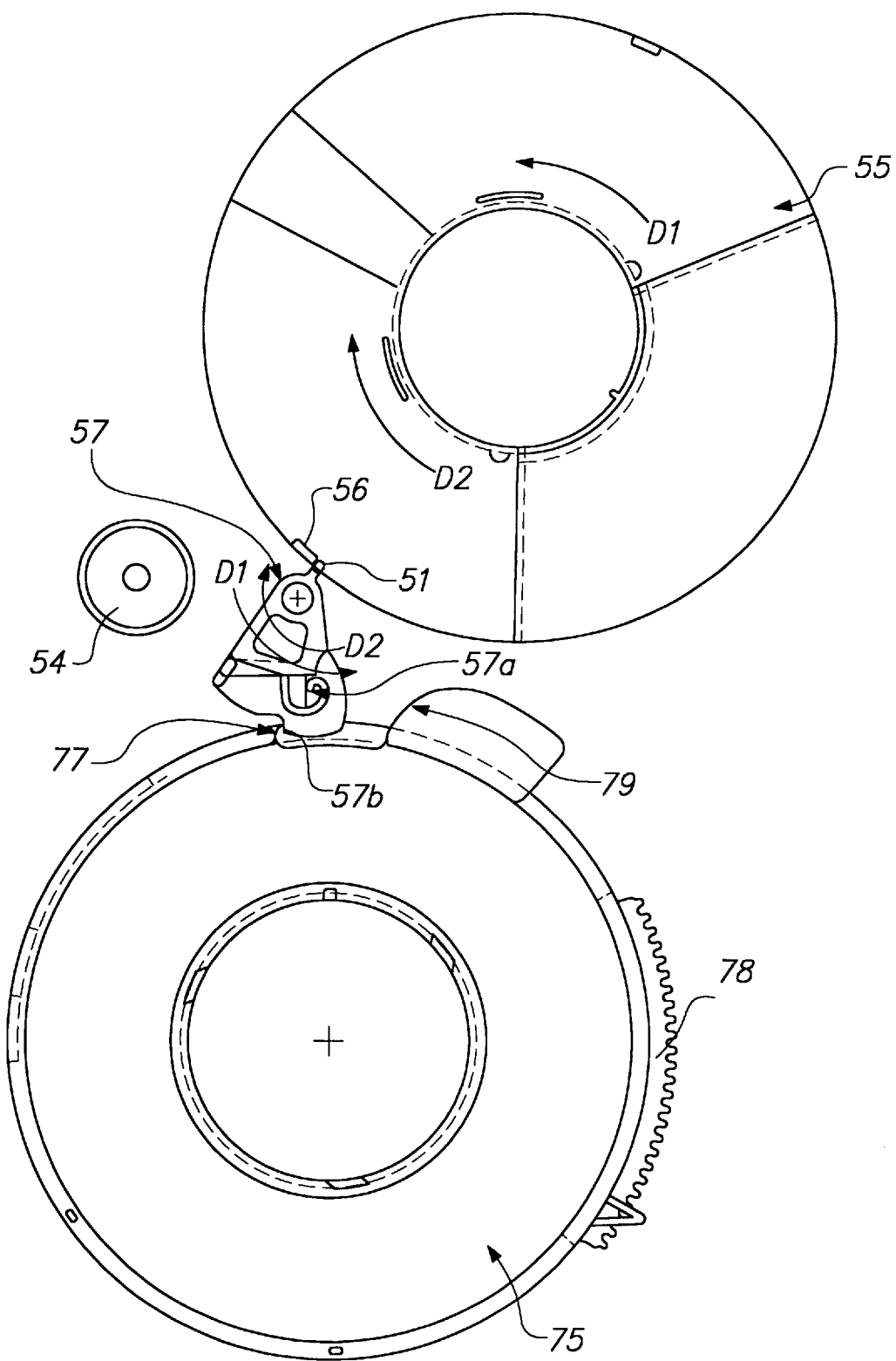
FIGS. 6–10 are sequential views of the locking system of FIG. 5b, showing the unlocking sequence after a tape cartridge is inserted into the tape drive.

The interaction between the components of the present locking system can best be illustrated in FIGS. 6–10, which shows sequential steps of unlocking the take-up reel 55 as a tape cartridge is inserted into the tape drive. To simplify the view of the present invention, each of FIGS. 6–10 shows only the take-up reel 55, a tape guide 54, the buckling cam 57 and the load ring 75. FIG. 6 represents the "unload" position of the present invention i.e. where the tape cartridge is not inserted into the tape drive. In this position, the locking system prevents take-up reel 55 from rotating. Specifically, load ring 75 is rotationally locked by the meshing between arcuate teeth member 78 and the gear train of DC motor 68. Consequently, buckling cam 57 is prevented from rotating in the clockwise direction, represented by arrow D2, by the abutting engagement between locking area 77 and contact area 57b. Buckling cam is also prevented from rotating in the counter clockwise direction, represented by arrow D1, by the abutting engagement between locking dimple 56 and locking element 51, which also prevents take-up reel 55 from rotating in the counter clockwise direction (D1). In addition, take-up reel is further prevented from clockwise rotation (D2) by the take-up leader, which is secured by hook member 57a.

Figure 7:
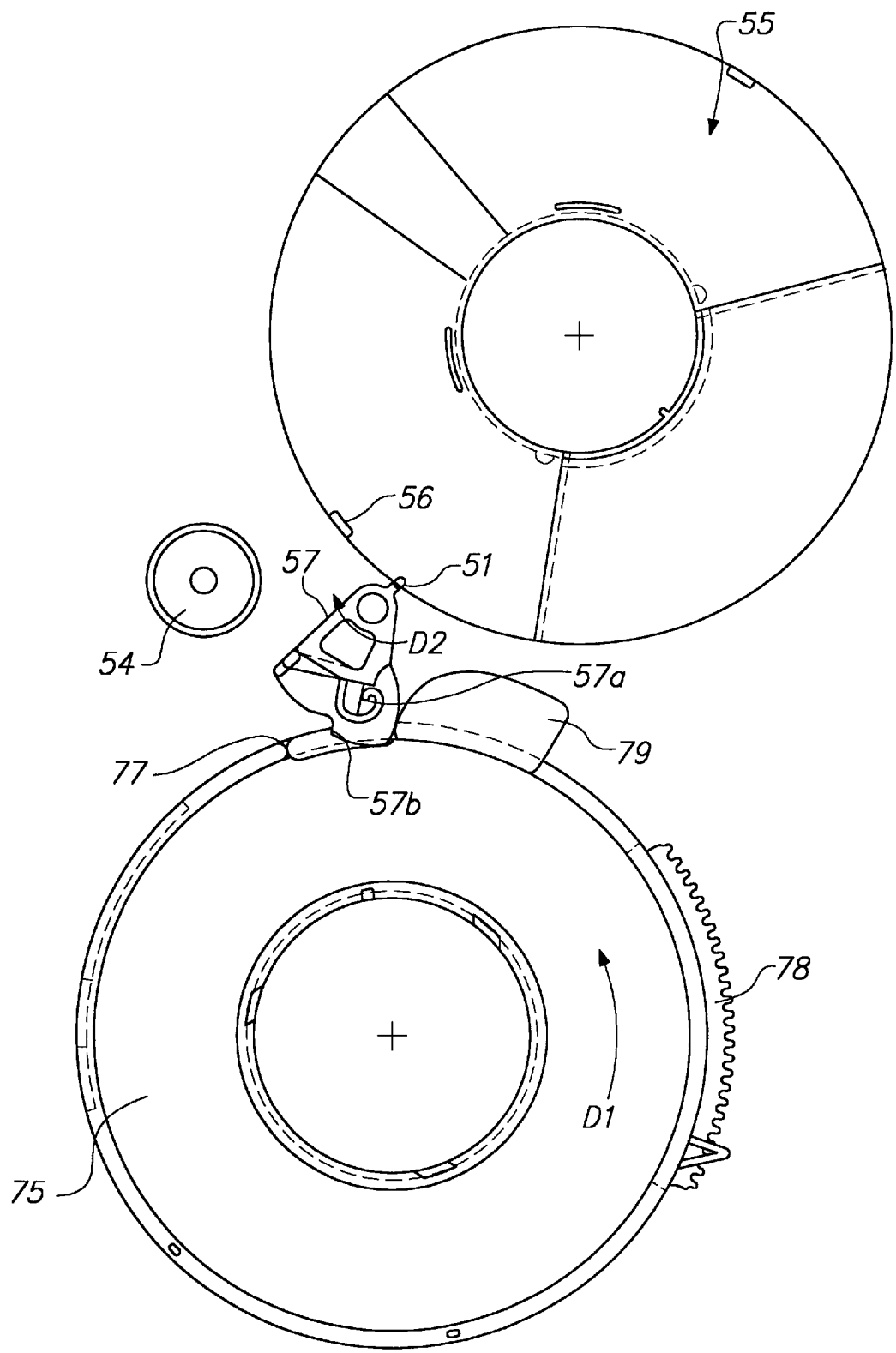
Figure 8:
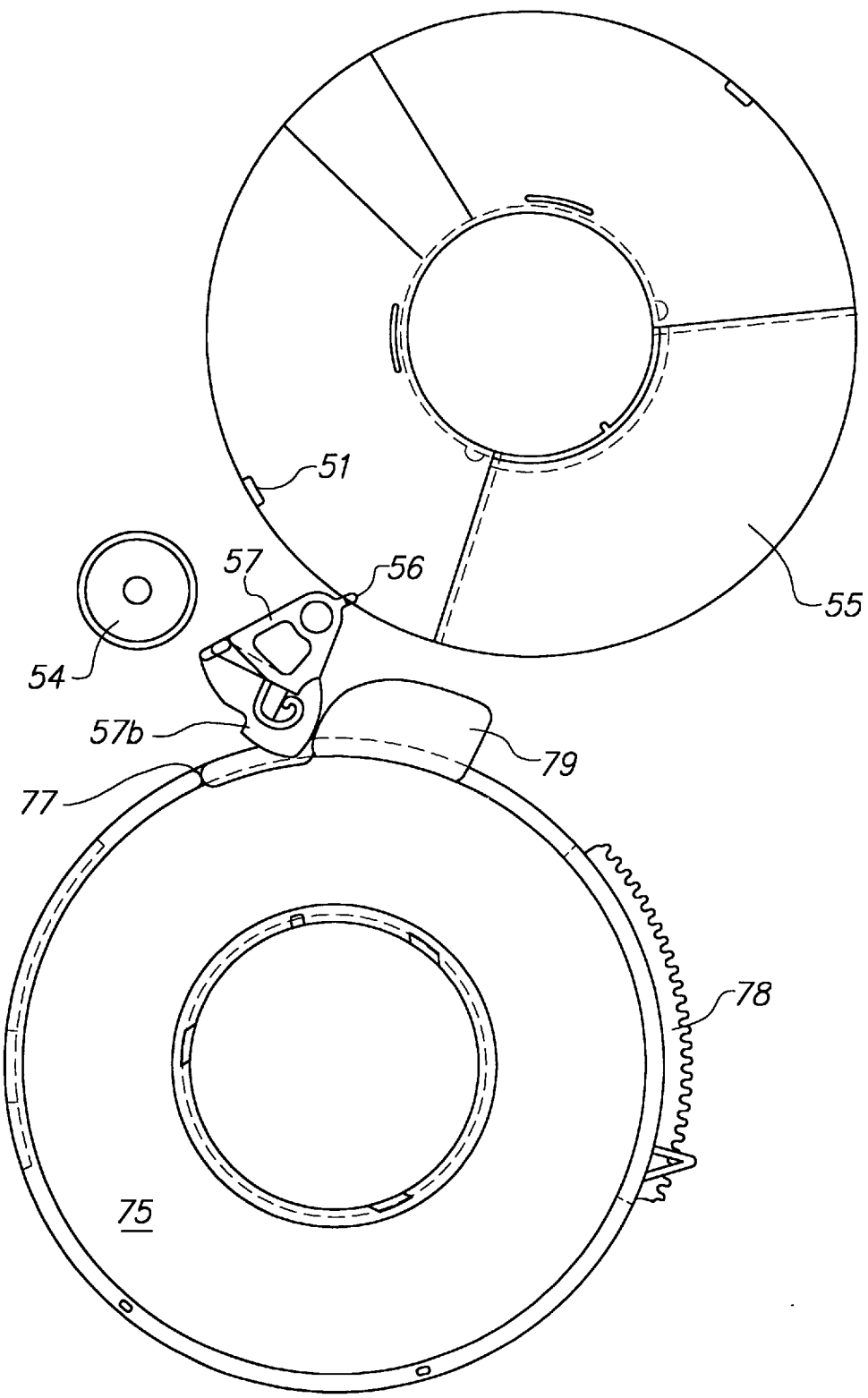
Figure 9:
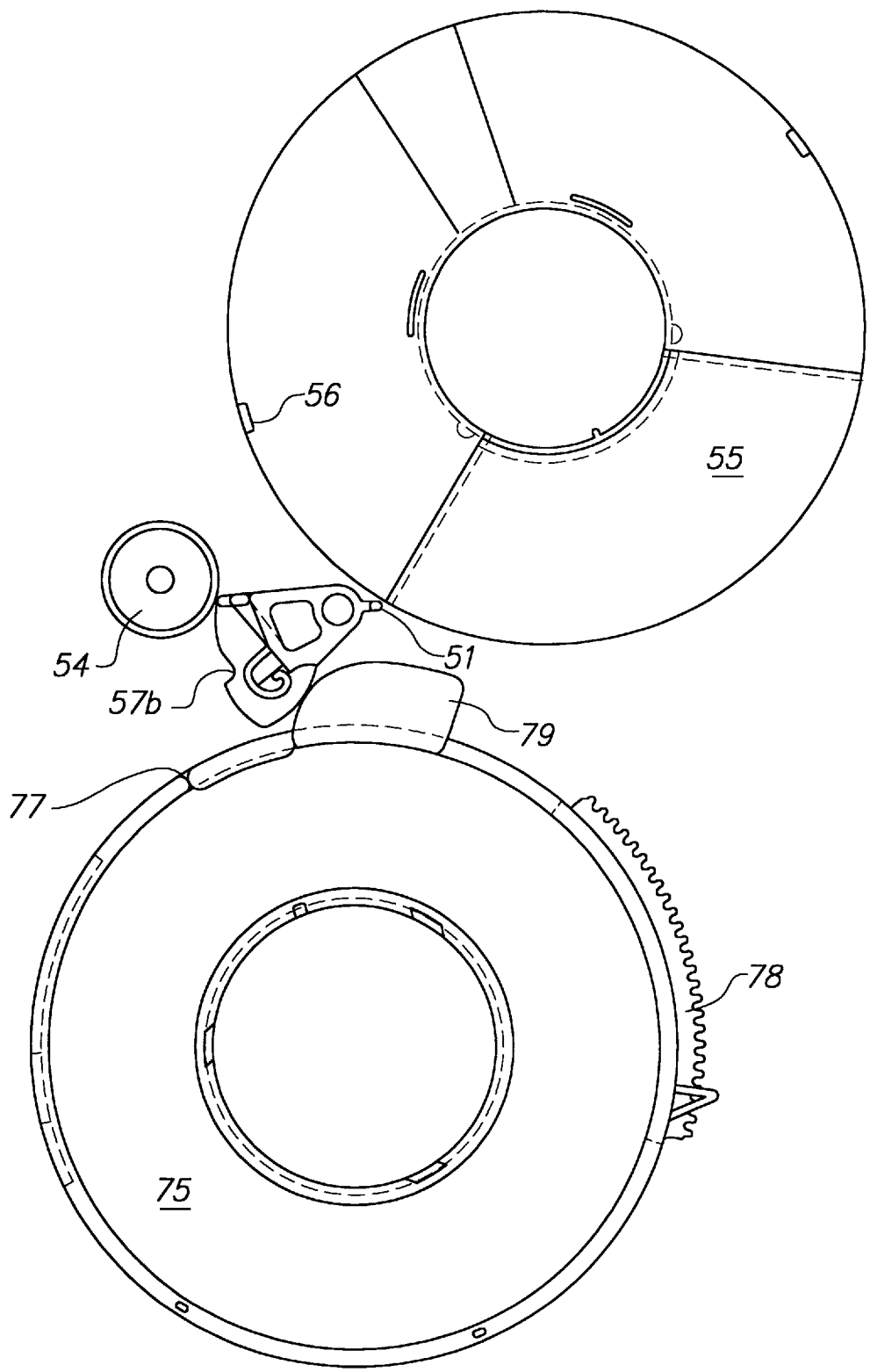

After the tape cartridge is inserted into the drive, DC motor 68 initiates a counterclockwise rotation of load ring 75, represented by arrow D1 in FIG. 7. As mentioned hereinabove, DC motor 68 includes a gear train (not shown) which meshes with arcuate teeth member 78 to transfer rotational movement to load ring 75. As load ring 75 rotates, camming surface 79 rotates into contact with and pushes buckling cam 57 into clockwise rotation, represented by arrow D2. As a result, locking area 77 and contact area 57*b* disengage from abutting contact. As camming surface 79 continues to force buckling cam 57 into further clockwise rotation, represented by FIGS. 7–9, locking engagement between locking element 51 and locking dimple 56 is also released. As a result, take-up reel 55 is then free to rotate in both directions, enabling tape from the cartridge to be transferred between the cartridge reel (not shown) and the take-up reel 55.

Figure 10:
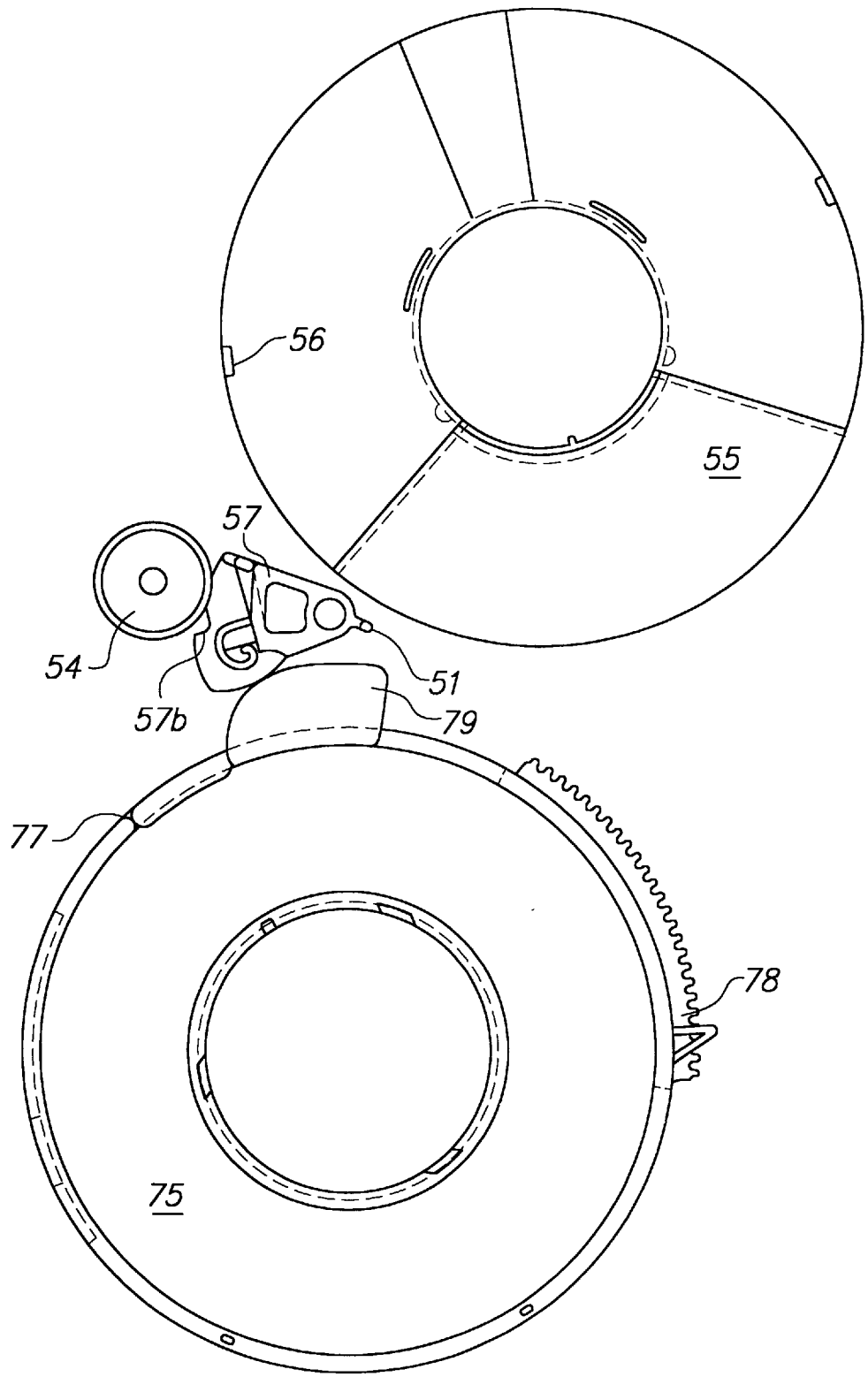

FIG. 10 shows the relative position of the buckling cam 57, load ring 75 and take-up reel 55 in a "cartridge loaded" position, i.e. after the cartridge is fully inserted and the cartridge leader and take-up leader are buckled. As shown, buckling cam 57 is eventually rotated such that locking dimple 51 does not interfere with the take-up reel flange 55 and such that hook member 57*a* completely disengages from take-up leader 11.

When the tape cartridge is ejected from the drive, the reverse occurs, i.e. as shown in reverse order from FIGS. 10–6. First, tape is wound back from the take-up reel onto the cartridge reel. As the cartridge leader and take-up leader 11 unbuckle, load ring 75 is driven in the counter clockwise direction. As camming surface 79 disengages contact with buckling cam 57, buckling cam 57 is biased back to the unload position shown in FIG. 6. Accordingly, hook member 57*a* re-engages with take-up leader 11. Finally, contact area 57*b* re-engages with load ring locking area 77 and locking element 51 re-engages with locking dimple 56. As explained above, with these three points of locking engagement, take-up reel 55 is now prevented from rotating in either direction.

To those skilled in the art, many changes and modifications will be readily apparent from consideration of the foregoing description of a preferred embodiment without departure from the spirit of the present invention, the scope thereof being more particularly pointed out by the following claims. The descriptions herein and the disclosures hereof are by way of illustration only and should not be construed as limiting the scope of the present invention which is more particularly pointed out by the following claims.

What is claimed is:

1. A locking mechanism for preventing a rotatable take-up reel, defined within a tape drive, from rotating, the locking mechanism comprising:

a first locking element defined on a flange in the take-up reel;

a second locking element defined about a rotatable buckling cam, the buckling cam being mounted in the tape drive, relative the take-up reel, such that the first locking element and the second locking element rotate into engagement, preventing the take-up reel from rotating when a tape cartridge is removed from the tape drive.

2. The locking mechanism of claim 1 wherein the first locking element comprises an arcuately shaped cutout defined along an outer periphery of the flange.

3. The locking mechanism of claim 2 wherein the second locking element comprises a protrusion extending from the buckling cam such that the arcuately shaped cutout is defined to engage the protrusion.

4. The locking mechanism of claim 1 wherein the first locking element comprises a dimple defined along a periphery of the flange.

5. The locking mechanism of claim 4 wherein the second locking element and the first locking element are defined for abutting engagement.

6. The locking mechanism of claim 1 wherein the second locking element and the first locking element disengage after the tape cartridge is inserted into the tape drive.

7. The locking mechanism of claim 1 wherein the take-up reel includes a take-up leader having one end attached to the take-up reel and a second end being engageable with the buckling cam.

8. The locking mechanism of claim 7 wherein a length of the take-up leader prevents the take-up reel from rotating in one direction when the cartridge is removed the tape drive.

9. A tape drive for receiving and operating upon an insertable tape cartridge, comprising:

a first locking element defined about a take-up reel, the take-up reel being rotatably mounted to the tape drive;

a take-up leader attached to the take-up reel;

a second locking element defined about a buckling mechanism, the buckling mechanism for holding and joining the take-up leader with a cartridge leader defined with data storage tape wound within the tape cartridge, the buckling mechanism being positioned relative the take-up reel such that the first locking element and the second locking element engage, preventing the take-up reel from rotating in a first direction when the tape cartridge is removed from the tape drive.

10. The tape drive of claim 9 further comprising:

a first locking area defined about the buckling mechanism;

a second locking area defined along an outer periphery of a load ring, the load ring being rotatably mounted to the drive at a position relative the buckling mechanism such that the first locking area and the second locking area engage to prevent the buckling mechanism from rotating in a second.

11. The tape drive of claim 9 wherein the take-up leader, being held by the buckling mechanism, prevents the take-up reel from rotating in the second direction.

12. In a tape drive having a rotatable reel mounted therein, a take up leader attached to the reel, a rotatable buckling mechanism for holding and joining the take-up leader with a cartridge leader defined in an insertable tape cartridge, a method for preventing the take-up reel from rotating when the tape cartridge is removed from the tape drive comprising:

defining a first locking element about a flange on the take-up reel;

defining a complementary second locking element about the buckling mechanism such that the first locking element and the second locking element are engaged, preventing the take-up reel from rotating in a first direction;

engaging the take-up leader with the buckling mechanism when the cartridge is removed to prevent the take-up reel from rotating in a second direction.

13. The method of claim 12 further comprising the steps of:

defining a first locking area about the buckling mechanism; and defining a complementary second locking area about a rotatably mounted load ring such that the first locking area and the second locking area are engaged when the cartridge is removed, preventing the buckling mechanism from rotating in the second direction.

14. The method of claim 13 wherein the first locking area and the second locking area disengage after the cartridge is inserted into the drive.

15. The method of claim 12 wherein the first locking element and the second locking element disengage after the cartridge is inserted into the drive.

16. A method of manufacturing a tape drive having a locking mechanism for preventing a rotatable take-up reel from rotating comprising the steps of:

provuing a housing for mounting:

the rotatable take-up reel, including a take-up leader attached thereon;

a head assembly for reading from and writing to data storage tape;

a rotatable buckling cam for releasably holding the take-up leader;

a rotatable buckling arm for urging the take-up leader into buckling engagement with a cartridge leader;

rotatable load ring adjacent the buckling cam;

defining an opening in the housing for receiving an removable tape cartridge;

defining a first locking element about a flange on the take-up reel; and defining a second locking element about the buckling cam such that the first locking element and the second locking element are rotatable into engagement, preventing the take-up reel from rotating in a first direction.

17. The method of claim 16 further including the steps of:

defining a first locking area about the buckling cam; and defining a second locking area about the load ring such that the first locking area and the second locking area are engaged when the cartridge is removed, preventing the buckling mechanism from rotating in the second direction.

* * * * *